United States Patent [19]

Ohkita

[11] Patent Number: 4,765,782
[45] Date of Patent: Aug. 23, 1988

[54] CUTTER

[75] Inventor: Masao Ohkita, Furukawa, Japan

[73] Assignee: Alps Electric Co., Ltd., Japan

[21] Appl. No.: 18,929

[22] Filed: Feb. 25, 1987

[30] Foreign Application Priority Data

Jul. 4, 1986 [JP] Japan ............... 61-156257

[51] Int. Cl.$^4$ .............................. B26D 1/12
[52] U.S. Cl. ...................... 407/24; 407/61; 407/58
[58] Field of Search .............. 407/24, 58, 61, 18, 407/19, 55, 63

[56] References Cited

U.S. PATENT DOCUMENTS

| | | | |
|---|---|---|---|
| 1,348,304 | 8/1920 | Müller | 407/24 |
| 1,567,733 | 12/1925 | Hanson | 407/24 |
| 1,795,093 | 3/1931 | Olson | 407/24 |
| 2,370,894 | 3/1945 | Walters | 407/24 |

FOREIGN PATENT DOCUMENTS 0955699 4/1964 United Kingdom ............... 407/24

Primary Examiner—Frederick R. Schmidt
Assistant Examiner—Blynn Shideler
Attorney, Agent, or Firm—Guy W. Shoup

[57] ABSTRACT

A cutter for forming a spiral groove on a work is provided.

The cutter comprises a cylindrical body provided on the outer periphery thereof with a plurality of cutting edges arranged circumferentially at equal intervals and displaced axially by a predetermined pitch. Further, each of the cutting edges is provided with a pair of additional cutting edges adjacent thereto and displaced circumferentially on both sides, respectively, so that when the work and the cutter are rotated in the same direction, a high-precision spiral groove is formed on the work.

A screw-shaft machined by the cutter according to the present invention is effectively used for a carriage transfer unit of a still video floppy disk drive, allowing accurate adjustment of the portion of the carriage and accurate transfer of the carriage with respect to the disk to be performed in a simple manner and at low cost.

3 Claims, 9 Drawing Sheets

FIG. 1
FIG. 2
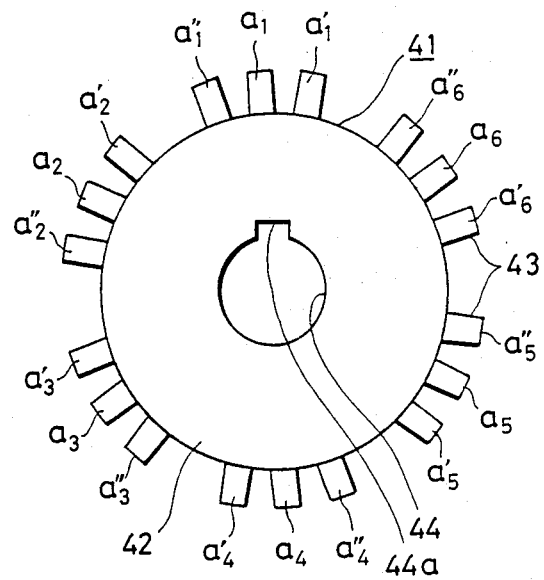
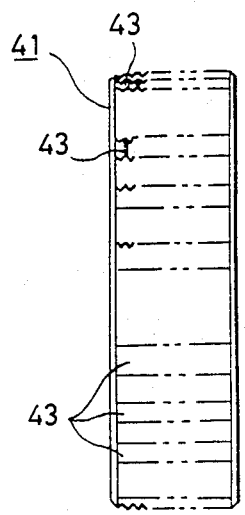
FIG. 3
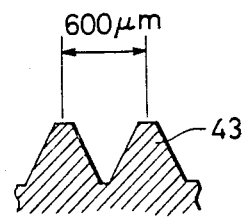

CUTTER

BACKGROUND OF THE INVENTION

1. Field of the Invention

The present invention relates to a cutter suitable for cutting a spiral groove on the outer periphery of a work such as an intermittent feed part.

2. Description of Prior Art

An intermittent feed mechanism has conventionally been known in which a screw-threaded member having a spiral groove on the outer periphery thereof is rotated by a predetermined angle so that a movable member engaging the spiral groove is reciprocated by a predetermined distance.

One example of such intermittent feed mechanism is the carriage transfer mechanism incorporated in the disk drive device covered by Japanese Patent Application No. 61-52357 filed by the subject applicant. An embodiment of the disk drive device disclosed in this application is the so called still video floppy device for recording/reproducing a still picture, an outline of which device will be explained hereunder with reference to FIGS. 10 through 16 of the accompanying drawings.

The disk drive device shown in the above figures comprises a frame 1, a slide plate 2 slidable vertically (See FIG. 10) on the upper part of the frame 1 and projections 6a and 6b provided on the side surfaces of the frame 1 so as to engage cam grooves formed in side plates 2a and 2b of the slide plate 2 adjacent to side plates 3 and 4 of the frame 1. Further, within the frame 1, there are provided a holder 7 for retaining a disk cartridge, a motor 9 attached to the upper part of the frame 1 so as to rotate a turntable 8 and forming a disk drive mechanism together with the turntable, a carriage 10 holding a head 37 and carried in the radial direction of a disk (not shown) at the upper part of the frame 1, a carriage transfer mechanism 12 for transferring the carriage 10 through a stepping motor 11 and a rock-lever 14 capable of regulating the sliding position of the slide plate 2.

The carriage transfer mechanism 12 used in the disk drive mechanism forms itself a carriage transfer unit 20. As shown in FIG. 12 (an exploded perspective view) and FIG. 13 (a sectional view of an essential part), the carriage transfer unit 20 is mainly composed of a support plate 21, a stepping motor 11 and a screw-shaft 22. As will be clear from FIG. 12, the support plate 21 is bent in two stages so that the stepping motor 11 is mounted to the lower surface of a stepping motor mounting section 23 located above the bottom plate 16 of the frame 1 and the screw-shaft 22 is held between bearings 26 and 27 supported by side walls 24 and 25 on both ends of the support plate 21. Thus the screw-shaft 22 and the stepping motor 11 are integrally mounted to the support plate 21 thereby forming a single unit.

An intermittent drive screw 28 threaded on and around the screw-shaft 22 is the same as that disclosed in Japanese Utility Model Application No. 60-67564 filed by the subject applicant and as shown in FIGS. 14 through 16, it is provided with a number of axially displaced grooves 22a on the outer periphery thereof over a predetermined range. Each of the grooves 22a runs parallel to the perpendicular Y normal to the axis X (that is, the lead angle is zero=$\theta_2$) and the bottom thereof is linear so that a spiral groove 22b is formed by the grooves 22a and a feed section 22c by which the carriage 10 is transferred by a predetermined pitch is formed at each of the portions where the adjoining grooves 22a connect to each other.

In the case of the carriage transfer unit 20 in which an engaging member 29 of the carriage 10 is caused to mate with the spiral groove (intermittent drive-screw) 22b of the screw-shaft 22, the carriage 10 travels in a predetermined direction in correspondence to the lead angle $\theta_1$ when the engaging member 29 slides within the feed section 22c of the spiral groove 22b while when the engaging member 29 comes to the desired one of the grooves 22a forming the spiral groove 22b, the stepping motor 11 is de-energized to stop the movement of the carriage 10. Thus, the carriage 10 moves due to the existence of the feed sections 22c and can stop at desired one of the grooves 22a so that it can be fed intermittently. In this case, as the lead angle $\theta_2$ of the screw-shaft 22 is zero within the groove 22a, even if the angle of rotation of the screw-shaft 22 should become displaced slightly, the stop position of the carriage 10 will be properly set to a high degree of accuracy.

The bearings 26 and 27 for supporting both ends of the screw-shaft 22 are pivot bearings which can rotatably support the ends of the shaft such that the end of the shaft on the side of the bearing 26 is urged toward the right in FIG. 13 by a compression spring 30 and the other end of the shaft on the side of the bearing 27 is adjusted of its position axially by an adjusting screw 31 embedded in the bearing 27. Further, the bearing 27 regulates the level of the carriage transfer unit 20 itself such that while it is supported by the side wall 25 of the support plate 21 as already mentioned, the end thereof in which the adjusting screw 31 is embedded is caused to project, as at 32, from the side wall 25 and the projection 32 is inserted into a support hole 33 in the side plate 4 of the frame 1.

A spur gear 34 fitted on the screw-shaft 22 meshes with a crown gear 36 fitted on the rotary shaft 35 of the stepping motor 11 fixed to the support plate 21 so that the stepping motion of the stepping motor 11 is transmitted to the screw-shaft 22 through the crown gear 36 and the spur gear 34, whereby the rotation of the stepping motor 11 is transmitted to the carriage 10 through the intermittent drive screw 28 to cause the carriage to advance straight step by step.

As described above, the disk drive device is designed to increase the accuracy of the stop position of the carriage 10 without the necessity of using a high-precision and expensive stepping motor, by forming on the outer periphery of the screw-shaft 22 the spiral groove 22b whose lead angle $\theta_2$ becomes zero within the groove 22a. And in order to machine such spiral groove 22b, a cylindrical cutter 38 shown in FIG. 17 is used. The cutter 38 is provided on the outer periphery thereof eight cutting edges 38 which are arranged at equal intervals in the circumferential direction and displaced from one another by ⅛ inch in sequence in the axial direction. The use of such cutter is advantageous in that since the spiral groove 22b can be formed on the outer periphery of a work to be finished to the screw-shaft 22 by rotating the cutter and the work in the same direction, cutting is performed in a simple manner without using a specific and expensive screw cutting lathe or the like.

PROBLEMS SOUGHT TO BE SOLVED BY THE INVENTION

Now, in the case of the above-mentioned disk drive device, the interval between tracks on the magnetic disk which is a still floppy disk (not shown) in this case is 100 μm and the amount of offtrack is regulated to ±15 μm at maximum in consideration of interchangeability of disks with respect to a playback device so that when fine adjustment of the position of the magnetic head 37 is made by the adjusting screw 31 according to the amount of offtrack, the quality of the image is noticiably improved.

However, the above disk drive device has difficulties in that although fine adjustment of the position of the magnetic head 37 is made by the adjusting screw 31, if recording is performed on the disk in a state in which the magnetic head is adjusted to the optimum position for playback, the disk will be recorded in an offtrack condition brought about at the time of playback. Therefore, when the disk is reproduced by another disk drive device, it becomes necessary to adjust the position of the magnetic head of that device according to the above offtrack condition and further, if recording is performed in turn by that another disk drive device and then reproduction is performed on the disk by still another disk drive device, the same fine adjustment will become necessary. Thus, when such fine adjustments are accumulated, the amounts of offtrack are accumulated to a value outside the aforementioned range of ±15 μm so that there is the possibility of disk interchangeability being spoiled.

To avoid the above disadvantages, it is necessary to set the position of the magnetic head by a servomechanism such that the magnetic head is always maintained at a regular track position at the time of playback and the above-mentioned fine adjustment is performed only during playback, especially when the disk recorded by a different disk drive device is reproduced. That is, the device is so set that when recording, the magnetic head is always returned to a preset recording position irrespective of its position adjusted at the time of playback while it can keep the optimum position during playback.

The above servomechanism is effected by moving the screw-shaft 22 itself toward its thrusting direction but the incorporation of such servomechanism into the disk drive device involves problems of hindering miniaturization and increasing costs.

Therefore, as already suggested by the subject applicant, in order to realize a carriage transfer device free of spoiling the interchangeability of disks, it is an effective method that each of the grooves having substantially linear bottoms on the outer periphery of the screw-shaft is divided into three small grooves so that the central groove corresponds to a regular track position and both side grooves correspond to fine adjustment positions on the disk and a single spiral groove is formed by displacing the side grooves toward the axially adjoining other two small grooves by predetermined fine adjustment tolerances (for example, the maximum offtrack amount) with respect to the central groove. And to realize such spiral groove divided into three small grooves of different orientations, a cutter capable of machining it has been desired to be produced.

SUMMARY OF THE INVENTION

Accordingly, an object of the present invention is to provide a cutter which is capable of cutting on the outer periphery of a cylindrical work a spiral groove of specific shape and irregular lead angles in a simple manner and to a high degree of accuracy.

In order to achieve the above object, the cutter according to the present invention is constructed such that n-numbered cutting edges are arranged on the outer periphery of a cylindrical body in such a manner that the cutting edges are spaced apart from one another at equal intervals in the circumferential direction and displaced by 1/n in the axial direction and a pair of additional cutting edges are provided adjacent to each of the first-mentioned cutting edges with additional cutting edges being displaced from each of the first-mentioned cutting edges by a predetermined angle circumferentially and by a predetermined pitch axially on both sides of the latter.

Further, the cutter according to the present invention functions such that when a work is applied to the cutter and rotated therewith in the same direction, n-numbered linear grooves and n-pairs of grooves displaced from the former grooves circumferentially on both sides by a predetermined angle and axially on both sides by a predetermined pitch are cut on the outer periphery of the work resulting in the formation of an axially extending spiral groove.

BRIEF DESCRIPTION OF THE DRAWINGS

FIG. 1 is a side view of a cutter according to the present invention;

FIG. 2 is a front view of the cutter shown in FIG. 1;

FIG. 3 is an enlarged sectional view of the cutter;

FIGS. 10 through 17 are views illustrating prior art devices associated with the subject invention of which:

FIG. 10 is a plane view of an essential part of a conventional disk drive device;

FIG. 11 is a front view of the same;

FIG. 12 is an exploded perspective view of a conventional carriage transfer unit;

FIG. 13 is a sectional view of an essential part of the carriage transfer unit shown in FIG. 12;

FIG. 14 is a front view of an essential part of a conventional screw-shaft;

FIG. 15 is a side view of the same;

FIG. 16 is a view illustrating the angle of rotation of a spiral groove and the travelling distance of the screw-shaft; and FIG. 17 is a side view of a conventional cutter for cutting the spiral groove of the screw-shaft shown in FIG. 16.

DETAILED DESCRIPTION OF THE INVENTION

Figure 4:
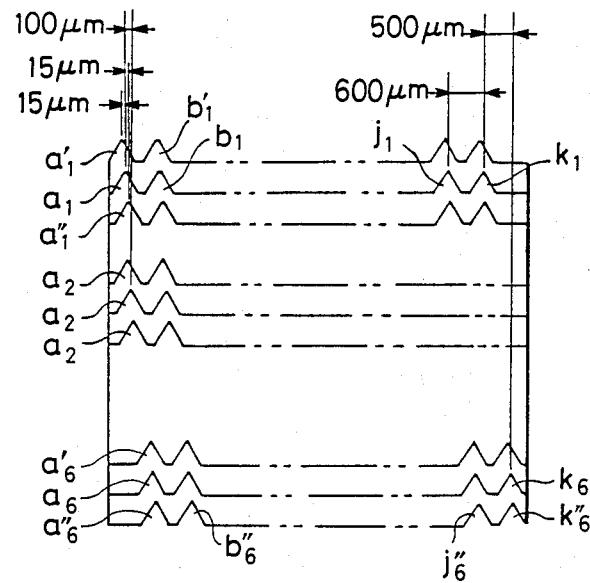
FIG. 4 is an illustrative development view of the cutter.

A preferred embodiment of the cutter according to the present invention will now be described with reference to FIGS. 1 through 9 of the drawings.

In FIGS. 1 and 2, the cutter 41 comprises a tubular body 42 made of carbon steel or the like material and a series of spirally formed cutting edges 43 made of superhard metal. The cutting edges 43 are fixed, by a suitable means such as brazing, to a predetermined position on the outer periphery of the tubular body 42. At the center of the tubular body, there is provided a mounting hole 44 with a keyway 44a. Further, each of the cutting edges 43 is angular in section as shown in FIG. 3 with the top thereof made slightly linear.

The cutting edges 43 are adopted to cut a spiral groove on a work and are formed circumferentially on the outer periphery of the tubular body 42 in such a manner that a total of six sets of cutting edges are arranged in a plurality of rows with each set including three cutting edges ($a_1'$, $a_1$ and $a_1''$, $a_2'$, $a_2$ and $a_2''$, ... or $a_6'$, $a_6$ and $a_6''$) at equal intervals. The cutting edges $a_1 \sim a_6$ are adopted to cut small groove sections of the spiral groove corresponding to the regular track positions on a still video floppy disk and the cutting edges $a_1' \sim a_6'$ and $a_1'' \sim a_6''$ are adopted to cut small groove sections of the spiral groove corresponding to fine adjustment positions, respectively, on the disk so that one pitch of the cutter in the circumferential direction is provided by these cutting edges. Further, the central cutting edges $a_1 \sim a_6$ of the sets are displaced from one another by 60 degrees ($2\pi/6$ radian) in the circumferential direction, and by 1/6 pitch in the axial direction, of the tubular body 42. In this case, the amount of displacement in the axial direction is set to 100 $\mu$m to conform to the track pitch of the still video floppy disk. Further, the cutting edges $a_1'$ and $a_1''$, ... $a_6'$ and $a_6''$ on both sides of the sets are displaced from the central cutting edges $a_1 \sim a_6$, respectively, in the circumferential direction and by a predetermined pitch in the axial direction with the amount of the axial displacement being set to $\pm 15$ $\mu$m to conform to the maximum allowable amount of offtrack on the disk. Accordingly, the adjoining two cutting edges of different sets (for example, $a_1'$ and $a_6''$) are displaced from each other by 30 degrees in the circumferential direction and 70 $\mu$m in the axial direction and when the tubular body 42 rotates by one pitch, they come to be displaced from each other in the axial direction by 600 $\mu$m per one pitch. As will be clear from FIG. 4 which illustrates an axially developed state of the cutter 41, the cutting edges are arranged such that every three of them makes one set with the central cutting edge being displaced axially by 100 $\mu$m from that of another set in sequence, one pitch of the cutter is provided by six sets and a total of 11 rows (a~K) with each row including 18 cutting edges are formed.

Figure 5:
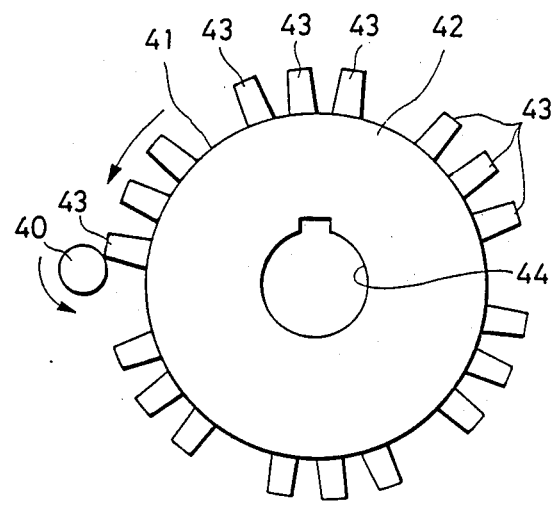
FIG. 5 is a side sectional view of the cutter showing how a work is cut by the cutter.

FIG. 5 is a side sectional view of the cutter 41 in the state of cutting a work 40. The work 40 and the cutter 41 rotate in the direction of the arrow at a speed ratio of 1:1 and upon feeding the cutter 41 by a predetermined amount toward the center of the work 40, the path of contact of the top of each cutting edge 43 with the work 40 becomes approximately linear so that a small V-shaped groove identical with the shape of the cutting edge is formed on the outer periphery of the work 40. This small groove is parallel to the perpendicular normal to the axis of the work 40. Therefore, when the cutting edge $a_1$ in FIG. 4 has cut a small V-shaped groove, the cutting edge $a_1'$ which is displaced axially from the cutting edge $a_1$ by 15 $\mu$m will cut another small V-shaped groove at a position displaced by 15 $\mu$m from the first small groove in the axial direction of the work 40 and subsequently, the cutting edge $a_6''$ which is displaced axially by 70 $\mu$m from the cutting edge $a_1'$ will cut still another small V-shaped groove at a position displaced axially by 70 $\mu$m from the groove cut by the cutting edge $a_1'$. Thus, by rotating the cutter 41 once, small V-shaped grooves corresponding to the positions of the cutting edges, respectively, of the cutter 41 are cut on the outer periphery of the work 40 thereby forming on the work a screw-threaded section having a width equal to the overall width of the rows of the cutting edges (a total of 11 rows) of the cutter 41. In this case, when it is difficult to cut a groove to a desired depth by a single path of contact, the amount of one time cutting by each cutting edge may be reduced to decrease the feeding amount of the cutter and the work 40 and the cutter 41 may be rotated continuously at the same time.

Figure 6:
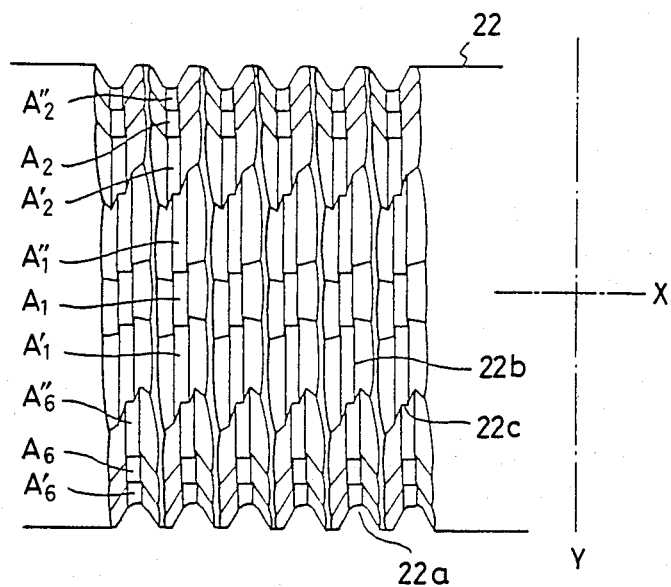
FIG. 6 is a front view of an essential view of a screw-shaft machined by the cutter.
Figure 7:
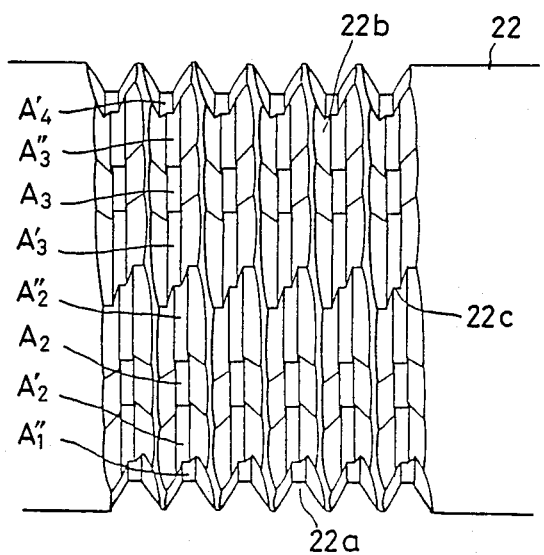
FIG. 7 is a plane view of the screw-shaft shown in FIG. 6.
Figure 8:
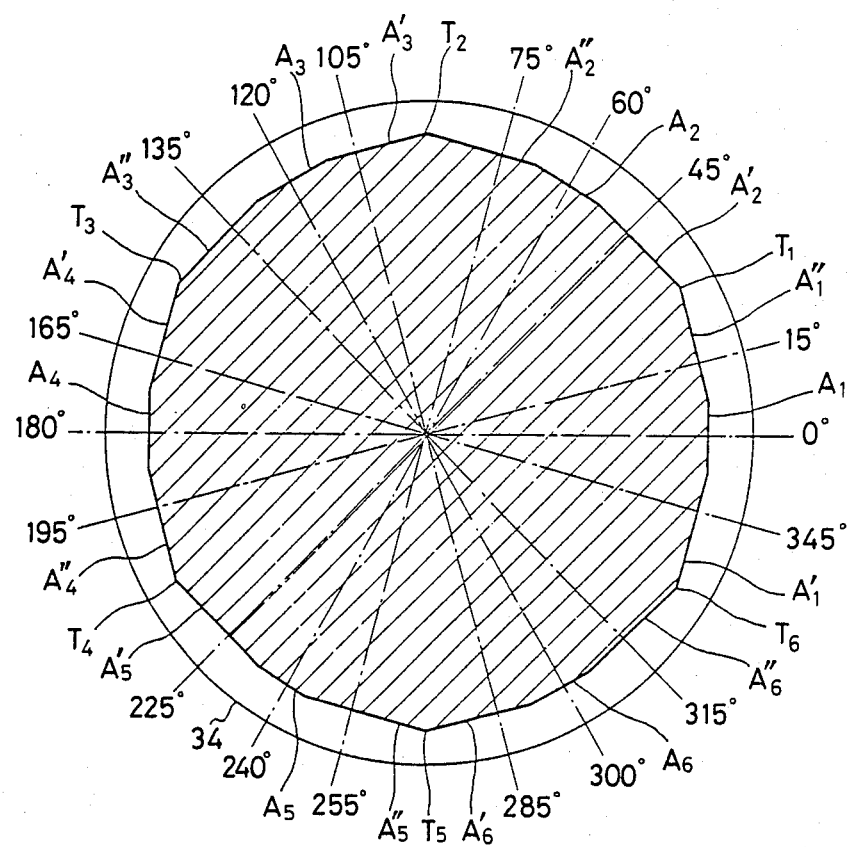
FIG. 8 is an illustrative view of the screw-shaft cut along the bottom of a spiral groove.
Figure 9:
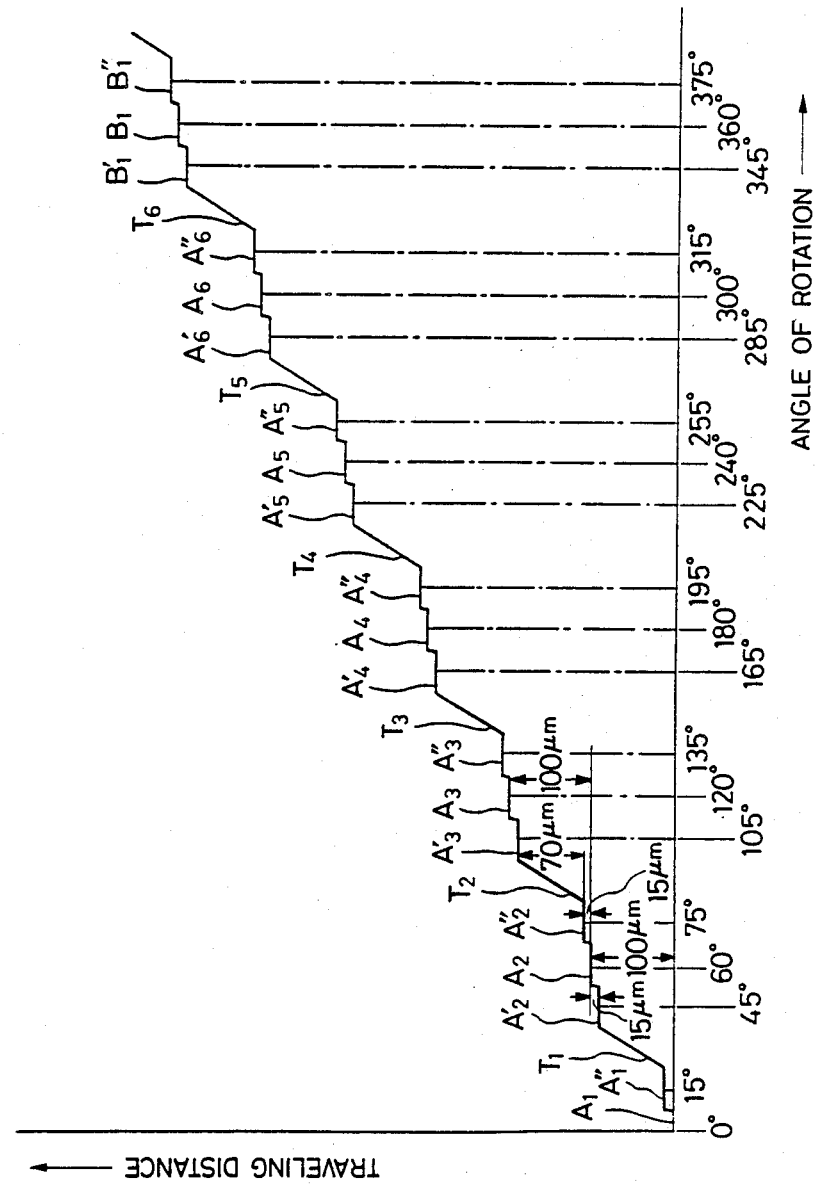
FIG. 9 is a view illustrating the angle of rotation and the travelling distance of the screw-shaft.
Figure 10:
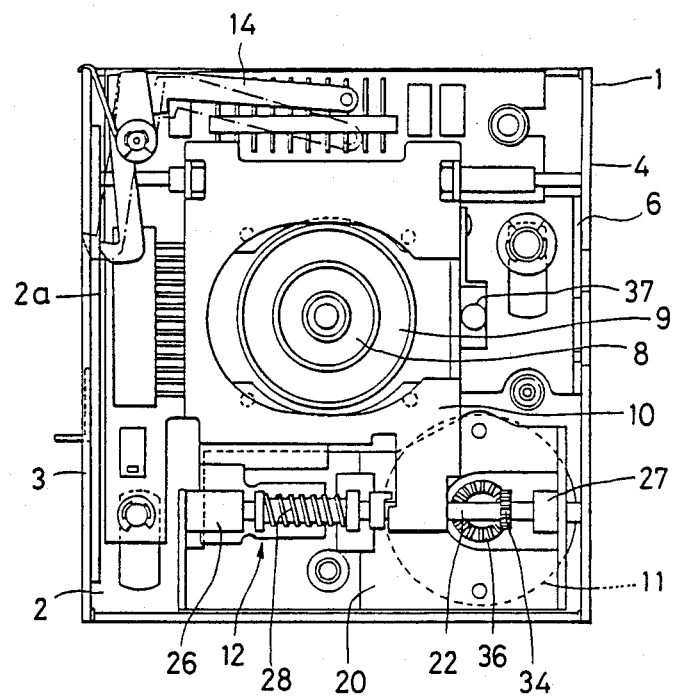
Figure 11:
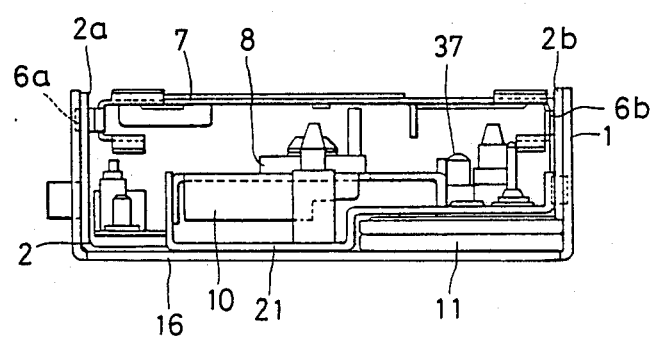
Figure 12:
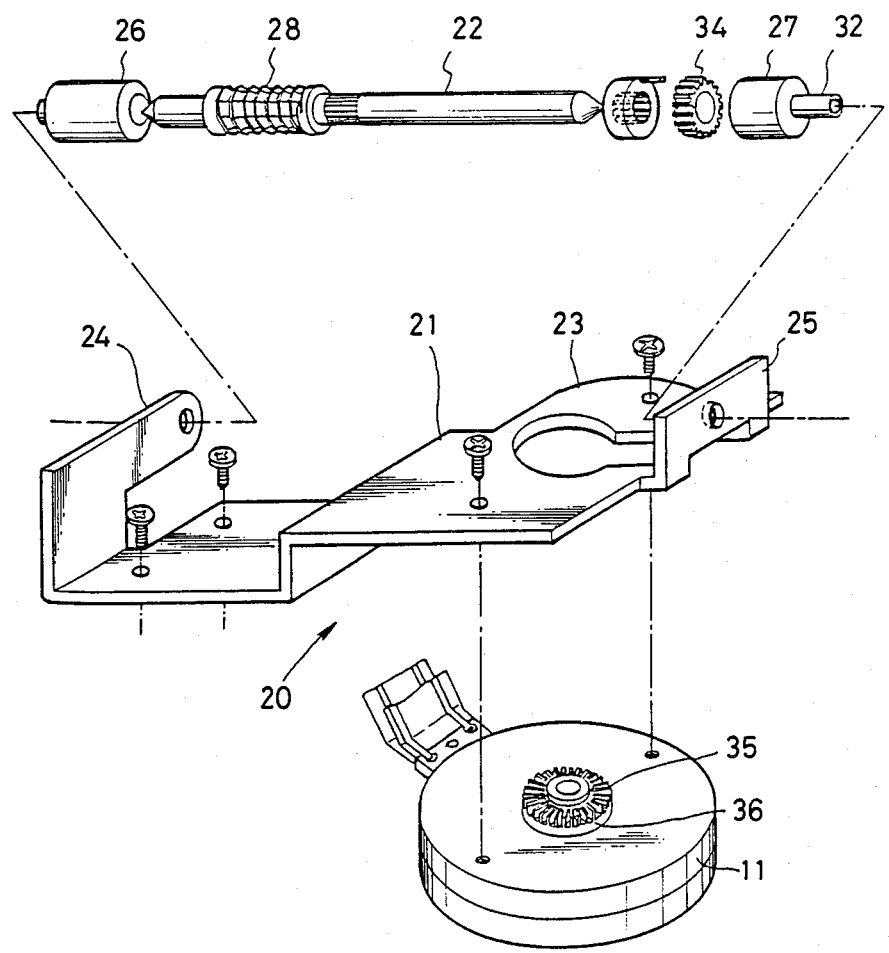
Figure 13:
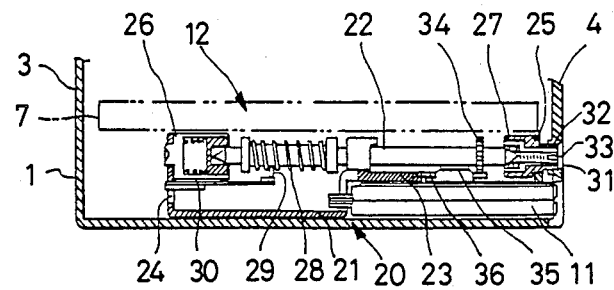
Figure 14:
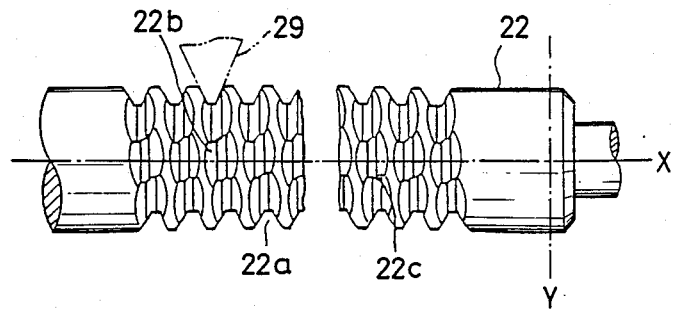
Figure 15:
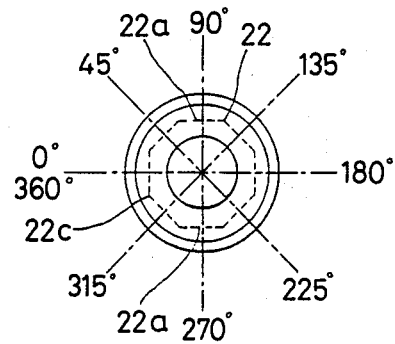
Figure 16:
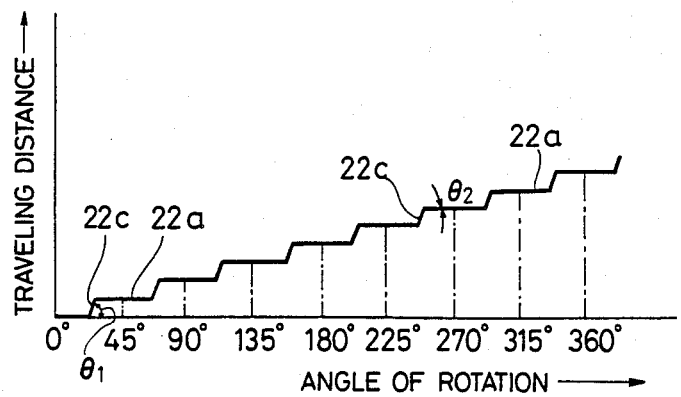
Figure 17:
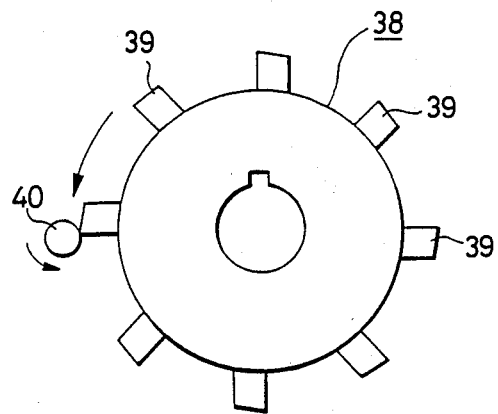

FIG. 6 is a front view of an essential part of a screw-shaft machined by the cutter 41, FIG. 7 is a plan view of the same, FIG. 8 is an illustrative view of the screw-shaft in section taken along the bottom of the spiral groove formed on the screw-shaft and FIG. 9 is an illustrative view showing the angle of rotation of the spiral groove and the travelling distance of the screw-shaft, wherein parts similar to those shown in the previously described prior art figures are designated by like reference numerals.

As will be seen from FIGS. 6 and 7, the screw-shaft 22 is provided on the outer periphery thereof with a number of grooves 22a each having a liner bottom and running parallel to the perpendicular to the axis X, that is, the lead angle thereof is zero. Further, they are displaced from one another in the direction of the axis of the screw-shaft 22 so that a spiral groove 22b is formed by them as in the case of the conventional one.

The spiral groove 22b includes first small grooves $A_1 \sim A_6$ corresponding to the regular track positions and second small grooves $A_1' \sim A_6'$ and $A_1'' \sim A_6''$ corresponding to fine adjustment positions described above, in corresponding to the positions of the cutting edges 43 of the cutter, thereby providing one circumferential pitch. Further, as shown in FIGS. 8 and 9, the small grooves $A_1 \sim A_6$ corresponding to the regular track position on the disk are displaced from one another axially by 100 $\mu$m and formed every 60 degrees in the circumferential direction in conformity to the track pitch of a still video floppy disk and the small grooves $A_1' \sim A_6'$ and $A_1'' \sim A_6''$ are formed circumferentially at both ends of the grooves $A_1 \sim A_6$, respectively, such that they are displaced toward the axially adjoining grooves $A_1 \sim A_6$ by $\pm 15$ $\mu$m in correspondence to the maximum allowable offtrack amount so that the entire circumference of the screw-shaft is divided into a total of 18 discontiguous small grooves. Further, the small grooves $A_1' \sim A_6''$ corresponding to the above-mentioned fine adjustment positions are formed at positions displaced by angles of rotation of $-15°$ and $+15°$, respectively, as shown in FIG. 8 with respect to the small grooves $A_1 \sim A_6$ corresponding to the regular track positions. This angle of rotation of $\pm 15°$ is set to correspond to one step of the stepping motor and as shown in FIG. 9, one track feed of the screw-shaft is effected by four steps of the stepping motor.

Next, the operation of the carriage transfer device provided with the screw-shaft 22 when it is used as a disk drive device for a still floppy disk camera will be described.

First, in recording, the engaging member of the carriage is always kept engaging the small grooves $A_1 \sim A_6$ of the screw-shaft 22 corresponding to the regular track positions on the disk and recording is performed in the above condition.

Second, in playback, the reproducing outputs of the playback device are detected in states in which the engaging member of the carriage is at the three sam 11 grooves $A_1$, $A_1'$ and $A_1''$, for example, of the screw-shaft for the purpose of selecting one of the grooves at which the maximum reproducing is obtained. Then, if the groove $A_1''$ displaced from the regular track position by $+15$ μm is selected, then the small grooves $A_2'' \sim A_6''$ displaced from all the regular track positions by $+15$ μm (or by an angle of 15°) may be selected since the tracks of the disk are spaced from one another by 100 μm, whereby the maximum reproducing output is obtained on every track. As described above, the displacement of the above grooves from the regular track positions corresponding to four steps of the stepping motor is once set by a servo circuit after detecting the optimum reproducing output, it will be possible to always obtain the best reproducing image. Further, in the case of replacing a reproducing still video floppy disk, if the servo circuit is so set that the engaging member of the carriage is always returned to the small grooves $A_1 \sim A_6$ of the screw-shaft regulating the regular track positions of the disk at the time of recording, there will be no confusion of track positions between recording and playback.

Transfer of the carriage by one track by four steps of the stepping motor is made possible in such a manner that since the amount of axial displacement of the adjoining two grooves (e.g., $A_2''$ and $A_3'$) of the screw-shaft is set to 70 μm, the carriage is caused to move across the adjoining section of the two grooves designated by $T_1 \sim T_6$ in FIGS. 8 and 9, which corresponds to the aforementioned feed section 22c of the screw-shaft by one step of the stepping motor. Therefore, the track position can be adjusted within a 15 μm range by one step of the stepping motor in a simple manner and at the same time, the carriage can be transferred from one track to the next by four steps of that motor accurately.

It should be noted that in the case of the present invention, the number of the cutting edges of the cutter or the intervals among them are not always limited to those of the embodiment described above and further, the speed or diametral ratio between the cutter and the work at the time of cutting is optional according to necessity.

As described above, the cutter according to the present invention is advantageous in that due to its specific shape, it can machine a spiral groove of specific shape and irregular lead angle of the outer periphery of a work in a simple manner and provide a product having a high-precision spiral groove the accuracy of which is determined by that of the edges thereof. Further, in case an intermittent drive-screw having a spiral groove machined by the cutter is used in a carriage transfer unit of a disk drive device, simple fine adjustment of offtrack and accurate transfer of the carriage can be realized simultaneously and at low cost.

I claim:

1. A cutter having cutting edges for cutting a spiral groove on a screw shaft, comprising:
   a cylindrical body extending in an axial direction and in a circumferential direction;
   a plurality of sets of grouped rows of cutting edges extending in the axial direction on said cylindrical body, each of said sets comprising one row of first cutting edges positioned between a pair of rows of second cutting edges spaced on each side thereof in the circumferential direction, wherein each set is spaced apart from an adjacent set by a first angular displacement in the circumferential direction, the first cutting edges of the one row in each set are spaced apart by a first pitch in the axial direction and are offset from the row of first cutting edges of an adjacent set by a second pitch in the axial direction,
   wherein, in each set, each of said pair of rows of second cutting edges is spaced on a respective side of the one row of first cutting adges by a second angular displacement in the circumferential direction, and the second cutting edges of one of said pair of rows are spaced apart by said first pitch and displaced by a third pitch to one side of respective ones of the first cutting edges in the axial direction, and the second cutting edges of the other of said pair of rows are spaced apart by said first pitch and displaced by said third pitch to the other side of said respective ones of the first cutting edges in the axial direction,
   said second angular displacement of the rows of second cutting edges in each set in the circumferential direction being a small fraction of said first angular displacement between adjacent sets, said third pitch of the second cutting edges from the respective first cutting edges in the axial direction in each set being a small fraction of said second pitch between the rows of first cutting edges of adjacent sets, and said second pitch being a small fraction of said first pitch between the first cutting edges in said one row of each set,
   whereby said cutter produces a spiral groove on said shaft having a series of grouped groove portions spaced from each other angularly in correspondence to said first angular displacement and offset axially in correspondence to said second pitch, and each group of groove portions is formed by a series of small groove sections spaced from each other angularly in coreespondence to said second angular displacement and offset axially in correspondence to said third pitch.

2. A cutter according to claim 1 wherein said first cutting edges are displaced from one another by 60 degrees in the circumferential direction, and by 1/6 pitch or 100 μm in the axial direction, of said cylindrical body.

3. A cutter according to claim 1 wherein said pair of second cutting edges are displaced by 15 degrees in the circumferential direction, and by ±15 μm in the axial direction, from each of said first cutting edges.

* * * * *